United States Patent [19]
Moore et al.

[11] Patent Number: 5,741,030
[45] Date of Patent: Apr. 21, 1998

[54] AIR DUCT STARTING COLLAR WITH QUICK MOUNTING MEANS

[76] Inventors: Michael A. Moore, 2607 Williams St.; Scott M. Barboza, 2621 Williams St., both of Dighton, Mass. 02715

[21] Appl. No.: 775,173

[22] Filed: Dec. 31, 1996

[51] Int. Cl.$^6$ .................................................. F16L 55/00
[52] U.S. Cl. ............................................. 285/23; 285/205
[58] Field of Search .................................... 285/205, 216, 285/158, 23

[56] References Cited

U.S. PATENT DOCUMENTS

| | | | |
|---|---|---|---|
| 524,051 | 8/1894 | Walker | 285/216 X |
| 526,285 | 9/1894 | Ayling | 285/216 X |
| 3,954,289 | 5/1976 | Martin, Sr. | 285/158 |
| 4,249,758 | 2/1981 | Harris | 285/158 |
| 4,620,729 | 11/1986 | Kauffman | 285/158 |
| 4,627,647 | 12/1986 | Hauff | 285/216 X |

FOREIGN PATENT DOCUMENTS 3807366  9/1989  Germany ........................ 285/216

*Primary Examiner*—Dave W. Arola

[57] ABSTRACT

An air duct starting collar having integral clips used for installation in a planar surface of an air duct. The flange of the device having a design permitting variance in hole size, and roughness of the hole's edge.

4 Claims, 6 Drawing Sheets

AIR DUCT STARTING COLLAR WITH QUICK MOUNTING MEANS

BACKGROUND—FIELD OF THE INVENTION

This invention relates to fittings used for connection of air ducts, whereby a generally round air duct would be connected to a generally planar surface of another air duct.

BACKGROUND—DESCRIPTION OF PRIOR ART

Heretofore, installers of heating, air conditioning, and other types of air distribution systems would install a generally round air duct for distribution of air to a remote location in the following manner. A hole would be formed into a generally planar surface of a main duct, or plenum using metal cutting shears, or various other methods. Into this hole would be installed a prefabricated fitting, usually of sheet metal material. This fitting would be tubular, having a formed bead along the circumference extending annularly outward. This bead prevents insertion of the fitting into the hole beyond a particular point. Multiple cuts or notches would be located on the portion of the fitting which extends into the main duct to form an array of tabs. After insertion these tabs would be bent outward thereby securing the fitting to the main duct. The remainder of the fitting would then be used for connection of the round air duct. This installation method requires an extensive amount of time and skill. Any inaccuracy on the hole's shape, or flatness of the formed edge will result in air leakage.

U.S. Pat. No. 3,954,289 to Martin (1976) describes improvements to this fitting. It incorporates an annular flange to replace the bead as previously mentioned. This flange allows for inaccuracy in the size of the formed hole, however it requires the installation of several external fasteners which is time consuming and tedious.

U.S. Pat. No. 4,249,758 to Harris (1981) and U.S. Pat. No. 4,620,729 to Kauffman (1986) both describe a similar device which has a flange incorporating a gasket with an adhesive allowing for an airtight seal. Installation of these devices without additional fastening products is quick, however the connection is not very secure. The mounting surface must be cleaned, removing any dirt, dust, or oil. In time the adhesive may also tend to degrade. Using additional screws or fasteners corrects this problem, but increases the installation time required. Also, concentricity of this device is difficult to maintain since no part is used to register the device to the formed hole.

All these devices lack the features needed to meet these objectives without introducing a cumbersome installation.

Therefore, the need exists for a device that will achieve a secure, airtight connection using no additional fasteners, power tools, or needless steps performed by an installer. It should be capable of installation with little regard to the accuracy of size, or the flatness of the edge in a formed hole.

OBJECTS AND ADVANTAGES

Accordingly, several objects and advantages of our invention are:

(a) to provide a duct starting collar incorporating a rapid means of installation.

(b) to provide a device which requires no additional hardware or fastening means required for a secure installation.

(c) to provide an airtight seal despite roughness of the edge or other irregularities, created on the surface of the main duct as a result of forming the hole.

(d) to incorporate a locating means to maintain concentricity between the fitting and the formed hole.

(e) to achieve all these objectives while maintaining a low cost of manufacturing and installation.

Further objects and advantages will become apparent from a consideration of the ensuing description and drawings.

DRAWING FIGURES

FIGS. 1A to 1C show various views of the collar.

FIG. 2A, and 2B depict different views of the mounting clip.

Figure 1A:
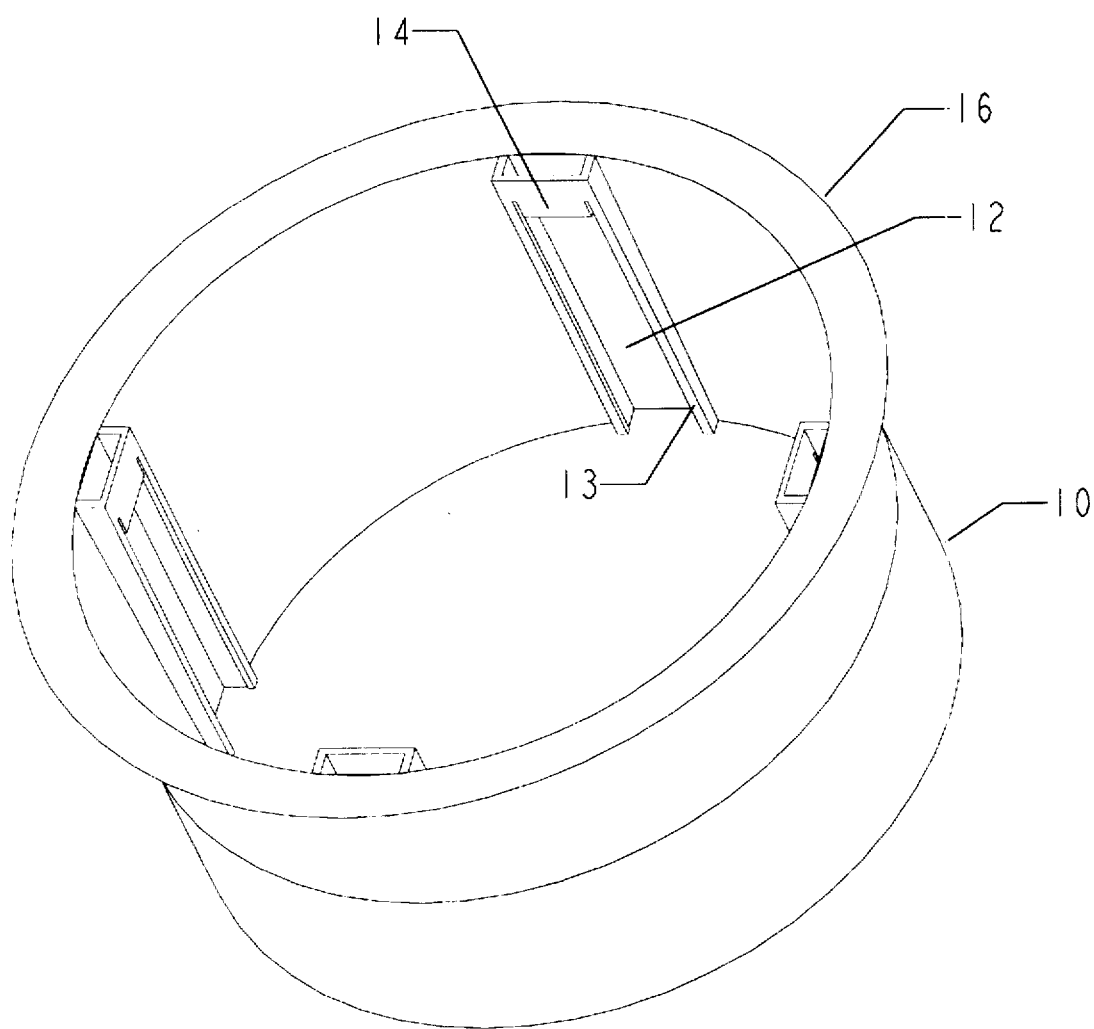

REFERENCE NUMERALS IN DRAWINGS 10 collar
12 guiding channel
13 L-Shaped members
14 spring catch
16 flange
18 clip retainer
20 leg
22 teeth
24 main body
26 hinge
28 air duct
30 mounting surface
32 assembly clip
34 tab

DESCRIPTION—FIGS. 1A–1C, 2A–2B, 3, AND 4

Figure 1B:
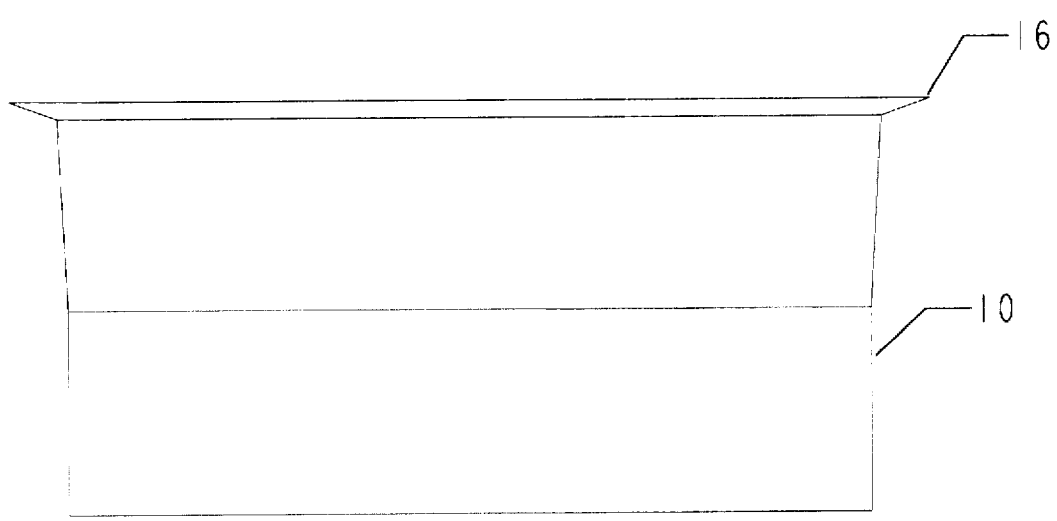
Figure 1C:
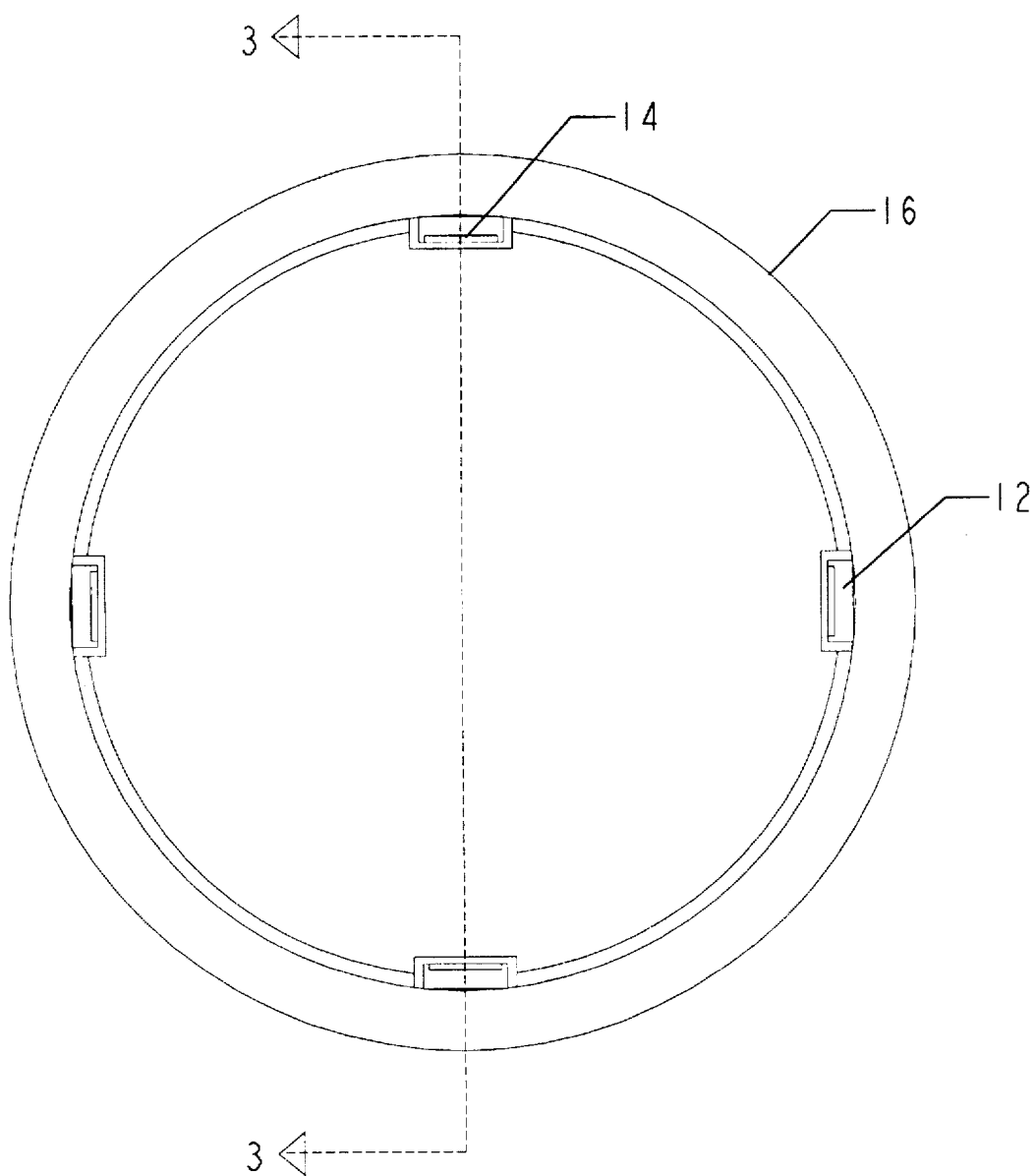

Different views of the invention are shown in FIG. 1A (isometric view), FIG. 1B (elevation view), and in FIG. 1C (plan view). A tubular shaped collar 10 of sufficient length and diameter to accommodate a rigid or flexible duct installation, terminates at one end with an outward facing annular flange 16. The thickness of flange 16 tapers with the thickest portion adjacent to the collar 10, and the thinnest portion at its outermost edge. Also, the flange 16 extends outward from the collar 10 at an angle greater than 90 degrees to have the thinnest, outermost portion of the flange 16 contact a mounting surface 30 first upon installation. A plurality of guiding channels 12 are located at equal distances along the inside circumference of collar 10. Each channel 12 consists of two parallel inwardly-facing L-shaped members 13. These form a channel 12 over a substantial length of the collar 10. At an end of the channel 12 adjacent to the flange 16, a flexible spring catch 14 joins a portion of the L-shaped members 13 together. A toothed clip retainer 18 is attached to the movable end of the spring catch 14.

Figure 2A:
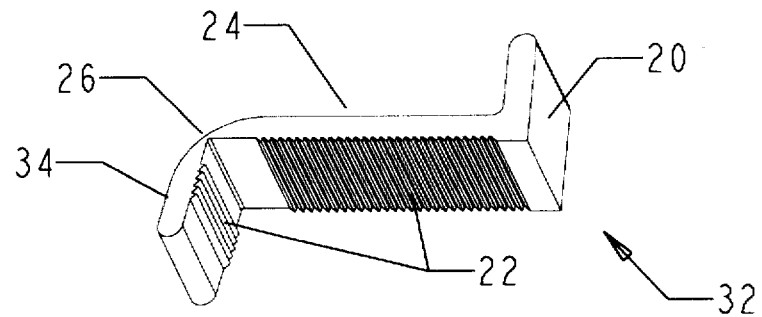
Figure 2B:
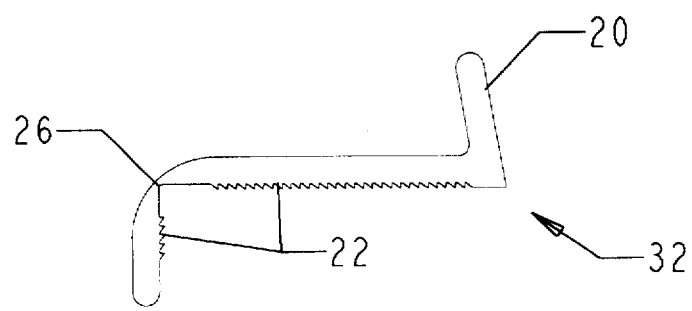
Figure 3:
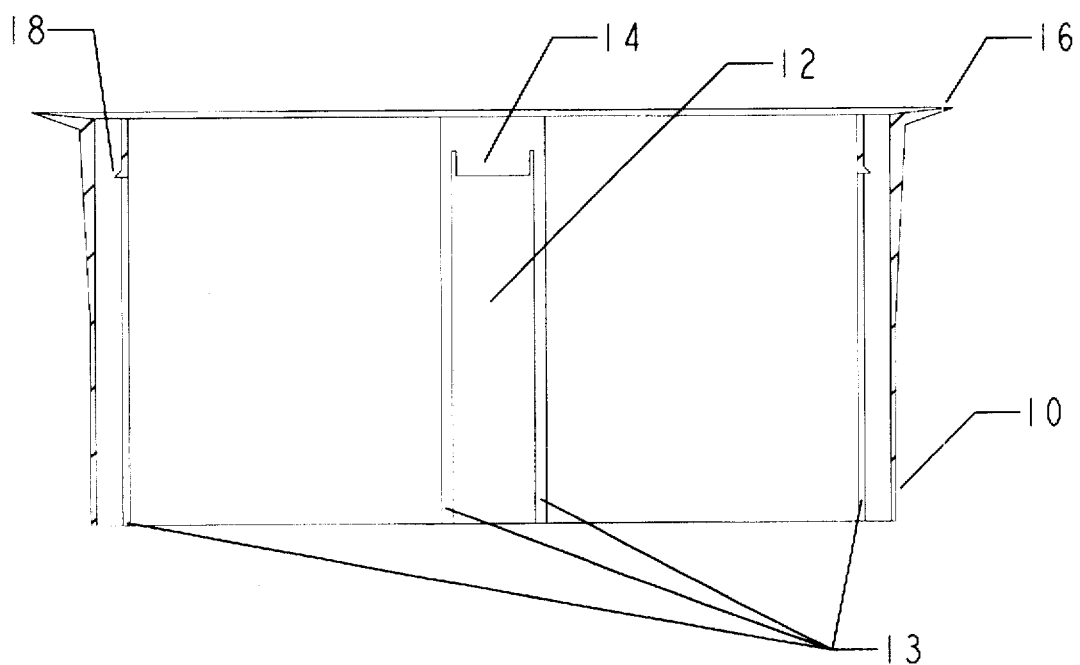
FIG. 3 shows a cross sectional view of the collar.
Figure 4:
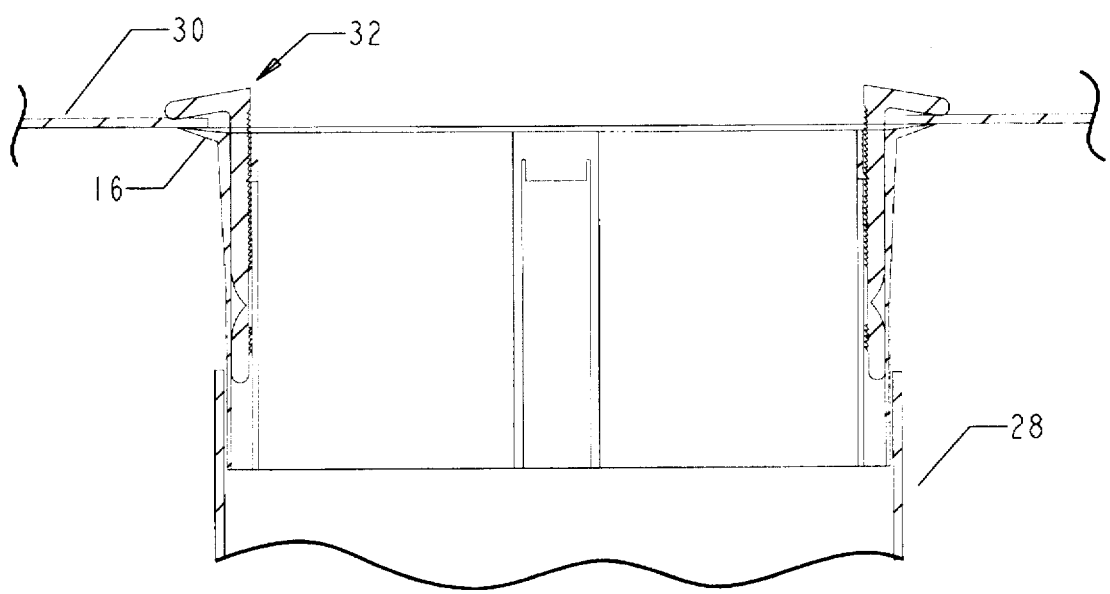
FIG. 4 shows an assembly view of the invention, partially installed in a mounting surface using two assembly clips.

FIG. 2A and 2B show an assembly clip 32 having sufficient thickness and width to fit into the guiding channel 12. This assembly clip 32 comprises a main body 24 with a plurality of angled teeth 22 along one side. At one end of the assembly clip 32 a leg 20 is formed at an angle of approximately 90 degrees to the main body 24. At a point along the main body 24, a hinge 26 is located creating a tab 34 from the main body 24. This tab 34 is faced at an angle opposite the leg 20, in a relaxed position, and contains teeth 22 on a side adjacent to the teeth 22 on the main body 24.

The invention described and illustrated herein may be manufactured using a low cost moldable material, preferably plastic (such as ABS, polyvinyl chloride, or polyethylene).

Operation—FIGS. 1A–1C, 2A–2B, C, D

The method of installing the present invention, and the function of its parts is described below. It is presumed at this time, that a plurality of assembly clips 32 have been factory pre-installed into the collar 10 with each tab 34 being held within a guiding channel 12 by engagement between the teeth 22 and a retainer 18. In this pre-assembled state the remaining main body 24 of each clip 32 will face the center of the collar 10, leaving each hinge 26 bent to an angle of approximately ninety degrees.

A hole of sufficient size is formed in a desired mounting surface 30. The invention is placed concentrically onto this hole until the outermost portion of the flange 16 contacts the mounting surface 30. An assembly clip 32 is then bent outward until its length is parallel with the adjacent guiding channel 12. While in this position the assembly clip 32 is inserted further into the guiding channel. The ratcheting action of the retainer 18 being held against the teeth 22 under tension from the spring catch 14 allows movement of the assembly clip 32 only in this one direction. This movement continues until the leg 20 contacts the back side of the mounting surface 30, securing the collar 10 in place. This process is repeated for each remaining assembly clip 32. As these clips 32 are further tightened against the back side of the mounting surface 30, the tapered flange 16, will flex and conform to any irregularities in the mounting surface 30. The collar 10 is now ready to accept a rigid or flexible air duct.

SUMMARY, RAMIFICATIONS, AND SCOPE

Accordingly, the reader will see that the Air Duct Starting Collar with Quick Mounting Means provides a quick, easy, low cost means of connecting a generally round air duct to a planar surface of a main duct or plenum. It provides an integral means of attachment along with features necessary to achieve an airtight seal with little regard to accuracy of size, or flatness of the edge of a formed hole. It requires no additional tools other than those necessary to form the hole in the surface of the main duct.

Although the description above contains many specificities, these should not be construed as limiting the scope of the invention but as merely providing an illustration of the preferred embodiment. For example, the clip retainer could be repositioned or made from a substance harder than the assembly clip, causing the retainer to wedge or penetrate the surface of the assembly clip, thereby eliminating the need for teeth on the assembly clip. Also, the collar is herein described as being round, but could be any geometric shape matching an air duct cross section. Also, the plurality of assembly clips could be one concentric ring, or several clips bonded by a ring.

Thus the scope of the invention should be determined by the appended claims and their legal equivalents, rather than by the examples given.

We claim:

1. An air duct starting collar assembly for connection around a hole in a mounting surface comprising:

a collar to accommodate connection of an air duct;

said collar having a central axis an annular radially outwardly facing flange on said collar to abut one side of the mounting surface when the collar is aligned with the hole;

a plurality of attachment means on said collar for retaining said flange in said abutment with said mounting surface comprising:

at least one assembly clip for engaging the side of the mounting surface opposite said collar, said clip having an insertion end and a mounting surface engaging portion;

guiding means for channelling and allowing movement of said assembly clip in a direction generally parallel to said central axis of said collar;

retaining means for engaging said clip insertion end to retain said clip and allow movement of said clip only in a direction which moves said mounting surface engaging portion closer to said flange;

said mounting surface engaging portion of said clip including a radially outwardly protruding leg to abut the mounting surface on the side opposite said flange when moved toward said flange to thereby sufficiently pinch the mounting surface between said leg and said flange for securing said collar to the hole in the mounting surface.

2. The assembly of claim 1 further including a plurality of notches or teeth along said clip angled to control the direction during installation and retain the position of said clip.

3. The assembly of claim 1 including means on said clip intermediate said insertion end and said mounting surface engaging portion, for allowing;

a hinging motion of said clip when said insertion end is partially installed in said guiding means, to position;

said clip mounting surface engaging portion inwardly to face said axis of said collar, thereby allowing placement of said starting collar onto the mounting surface without interference between the mounting surface and any portion of said clip.

4. The assembly of claim 1 wherein said flange is tapered with the thickest portion adjacent to said collar and the thinnest portion at the radially outermost edge thereof;

and said flange extends at such an angle to the collar to allow flexing of the flange upon said pinching of the mounting surface between said leg and said flange to allow for variation in the surface of the mounting surface.

* * * * *